UNITED STATES PATENT OFFICE 2,603,663

REACTION OF OLEFINS WITH CF$_2$ClCFCl$_2$

Charles F. Feasley and William A. Stover, Woodbury, N. J., assignors to Socony-Vacuum Oil Company, Incorporated, a corporation of New York No Drawing. Application May 10, 1947, Serial No. 747,320

4 Claims. (Cl. 260—648)

This invention relates to a method of reacting olefins with alkyl halides in the presence of an oxygen-containing gas, and to the products of such reaction.

M. S. Kharasch, Elwood V. Jensen, and W. H. Urry have reported the addition of carbon tetrachloride and chloroform to olefins using diacyl peroxides (Science, 102, 128 [1945]). Likewise, they have studied the addition of chlorinated acid derivatives such as CH$_2$ClCO$_2$CH$_3$ and CCl$_3$COCl (J. Am. Chem. Soc. 67, 1626 [1945]), the addition of PCl$_3$ (J. Am. Chem. Soc. 67, 1864 [1945]) and CBr$_4$ or CHBr$_3$ to 1-olefins using very small proportions of diacyl peroxides.

Bartlett, Condon, and Schneider (J. Am. Chem. Soc. 66, 1538 [1944]) have studied reactions of t-butyl chloride with methylcyclohexane using aluminum chloride to form as one product 1-chloro-1-methylcyclohexane. Likewise, they have studied the reaction of t-amyl bromide with aluminum bromide at a temperature of 20° C.

Schmerling (J. Am. Soc. 67, 1438 [1945]) has studied the addition of isobutane to allyl chloride or vinyl chloride using aluminum chloride, ferric chloride, etc.

United States Letters Patent 2,068,772 deals with the addition of CH$_3$CHCl$_2$ to vinyl chloride or 1,2-dichloroethylene using aluminum chloride at a temperature of 20° C. Chloroform has been added to tetrachloroethylene in the presence of aluminum chloride to obtain heptachloropropene (J. Prakt. Chem. 89, 415).

The addition of halides to olefins in the presence of hydrogen fluoride has been described in United States Letters Patent application, Serial No. 549,762, filed by Badertscher and Feasley on August 16, 1944, now abandoned.

There are many patents dealing with the addition of hydrogen halides to olefinic materials to give halides or polyhalides. United States Letters Patent 2,393,304 deals with the addition of hydrogen chloride to tetrafluoroethylene at a temperature of 300° C. using a silver reactor. United States Letters Patent 2,365,516 deals with the same addition using activated carbon. Hydrogen bromide has been added to olefins using peroxides to get addition contrary to Markownikov's rule (United States Letters Patent 2,058,465). United States Letters Patent 2,058,466 deals with the normal addition of hydrogen halides in the presence of thiophenol or thiocresol.

Hydrogen halides have been added to olefinic materials using various acidic catalysts or Friedel-Crafts catalysts (United States Letters Patent 2,016,072 employs sulfuric acid; United States Letters Patent 2,031,228 employs alkylhalosulphonates; United States Letters Patent 2,094,064 makes use of silica gel, zinc chloride or stannic chloride; United States Letters Patent 2,125,284 employs ethyl sulfuric acid with bismuth chloride; United States Letters Patent 2,123,504 deals with the addition of HCl to butadiene using copper halides; United States Letters Patent 2,140,927, 2,179,218, and 2,209,000 employ aluminum chloride or ferric chloride; United States Letters Patent 2,144,816 makes use of kieselguhr or acids of phosphorus at temperatures of 200–500° F.; and United States Letters Patent 2,174,278 employs bismuth chloride at temperatures of 100–250° C.) to form halides.

Halides have likewise been prepared from alcohols using hydrogen halides (United States Letters Patent 2,090,722 deals with the preparation of fluorides from alcohols and hydrogen fluoride), halides of phosphorus (see United States Letters Patent 2,099,357) or similar reagents such as thionyl chloride, etc.

No reference was found to the use of air to bring about the addition of any alkyl halides to olefins.

According to the present invention is has been found that any alkyl halide may be readily reacted with any olefinic material, in the presence of air or oxygen, to give a halide of higher molecular weight. The resultant products are particularly useful as refrigerants, insecticide ingredients, selective solvents for petroleum refining, stable synthetic lubricants, hydraulic fluids, heat transfer agents and the like.

The process of preparing these new reaction products is superior to processes which add polyhalides such as carbon tetrachloride to olefins, by the use of peroxides, acids or Friedel-Crafts catalysts, because it can be accomplished simply and easily without the use of an expensive catalyst which is difficult, if not impossible, to remove from the products and recover for reuse. Furthermore, the reaction products of this invention are different from those produced by the above mentioned processes.

REACTANTS

The preferred olefins for the reaction of this invention are simple, straight-chain primary olefins containing from 2 to 20 carbon atoms. However, branched-chain olefins, olefins containing a plurality of double bonds per molecule, cyclo-olefins, such as cyclohexene, and olefins containing various substituents may be also utilized. Still further, halides, alcohols and the like, which are readily converted into olefins may be used in place of olefins. The olefin used may be a single, pure olefin, a mixture of pure olefins, a commercial olefin, or a commercial mixture of olefins.

The halides used preferably contain between 1 and 24 carbon atoms, inclusive, but may contain even more carbon atoms per molecule. In the examples, which follow, polyhalides were used, but it is to be understood that monohalides can be used, halides containing only one kind of halogen can be used, or halides containing two or more different kinds of halogens can be used. Furthermore, the alkyl halides may be either saturated or unsaturated and may contain aryl, hetero, cycloalkyl, alkaryl, aralkyl, heteryl (such as thienyl, pyrryl, etc.), alkheteryl (such as methyl thienyl, etc.), hetero-alkyl, cyanide, sulphate, nitrocarboxyl, hydroxyl, or the like substituents. As with the olefin, the alkyl halide may be a single, chemically pure alkyl halide, a mixture of chemically pure alkyl halides, a commercial alkyl halide, or a commercial mixture of alkyl halides.

The oxygen-containing gas used in the reaction can be described as any gas which contains free oxygen, such for example as air and oxygen itself. Synthetic mixtures of oxygen and an inert gas such as helium could be used. The free oxygen-containing gas of this invention is to be distinguished from such materials as diacyl peroxides, and other peroxides, even if these peroxides should be used in a gaseous phase. The reaction using the free oxygen-containing gas of this invention, is quite different from the reaction accomplished in the presence of peroxide, hydrogen chloride, or the like, and produces a different type of product.

REACTION CONDITIONS

The reaction of this invention is accomplished at temperatures ranging from 25° C. to 350° C., although temperatures of 100° C. to 250° C. are preferable. The upper temperature limit will depend somewhat upon the reactants chosen and must be low enough to avoid excessive cracking and decomposition of the reactants and the products.

The reaction will ordinarily be accomplished under superatmospheric pressure and it has been found preferable to use as much pressure as can be safely used without danger of explosion. High pressures appear to definitely favor the reaction, but the reaction proceeds even at pressures as low as 100 pounds per square inch. The preferred range of pressure is from 600 to 1400 pounds per square inch.

The process may be carried out continuously or batchwise. For example, the reaction may be accomplished in an electrically heated, Monel lined, rocking bomb, into which the reactants and the oxygen-containing gas are charged. The bomb is then rocked and heated for the desired period of time, after which it is chilled and the oxygen-containing gas vented. The product is thereafter distilled to remove unreacted polyhalides and olefins and to separate the various fractions of the product.

The proportion of air or free oxygen-containing gas used is not highly critical. Proportions have been successfully used ranging from 0.31% by weight of oxygen (as air) to 1.01% by weight of oxygen (as air), based on the total weight of the reactants. As little as 0.5% oxygen can be used, or as much as 5.0% oxygen can be used, satisfactorily. If a percentage of oxygen much less than 0.5% is used, the reaction is slowed down, whereas if appreciably higher percentages than 5.0% are used, the products are unnecessarily diluted with the free oxygen-containing gas.

By way of example, the following table shows the results of nine reactions performed in the manner described:

*Table*

| Run No. | Reactants Compound | Gms. | Catalyst | Temp. °F. | Press. p. s. i. | Contact Time, Hrs. | Grams Total of Product |
|---|---|---|---|---|---|---|---|
| 1 | $CF_2ClCFCl_2$ (Freon 113) | 465 | Air | 520 | 1,400 | 4.5 | 135.5 |
|   | Pentene-1 | 145 |   |   |   |   |   |
| 2 | $CF_2ClCFCl_2$ (Freon 113) | 608 | Air | 455 | 1,000 | 5.0 | 148.5 |
|   | Octene-1 | 128 |   |   |   |   |   |
| 3 | $CF_2ClCFCl_2$ (Freon 113) | 625 | Air | 450 | 1,000 | 6.6 | 106.1 |
|   | Cyclohexene | 100 |   |   |   |   |   |
| 4 | $CF_2ClCFCl_2$ (Freon 113) | 650 | Air | 430 | 900 | 7.0 | 104.5 |
|   | Octene-2 | 100 |   |   |   |   |   |
| 5 | $CCl_2F_2$ (Freon 12) | 250 | Air | 430 | 600 | 2.0 |   |
|   | Octene-1 | 112 |   |   |   |   |   |
| 6 | $CCl_2F_2$ | 260 | Air | 420 | 800 | 4.5 |   |
|   | Pentene-1 | 72 |   |   |   |   |   |
| 7 | $CH_3CCl_3$ | 400 | Air | 350–375 | 500–600 | 5.5 | 294.5 |
|   | Decene-1 | 240 |   |   |   |   |   |
| 8 | $CCl_4$ | 200 | Air | 350–375 | 600–1,000 | 4.0 | 84.5 |
|   | Decene-1 | 200 |   |   |   |   |   |
| 9 | $ClCH_2CH_2Cl$ | 200 | Air | 350–375 | 400 | 4.0 | 153 |
|   | Decene-1 | 200 |   |   |   |   |   |

PRODUCT

| Run No. | Fraction Number | B. P. °C. | Weight of Fraction | Sp. Gr. | Percent F. | Percent Cl | Remarks |
|---|---|---|---|---|---|---|---|
| 1 | 1 | 95-124 | 68.5 | 0.95 | 0.1 | 0.61 | Solid |
|   | 2 | 126 | 10.5 | 1.01 | 24.6 | 30.46 |   |
|   | 3 | 140-151 | 24.5 | 1.02 | 21.4 | 32.42 |   |
|   | 4 | 192-207 | 7.0 | 1.00 | 20.1 | 25.83 |   |
|   | Residue | >207 | 25.0 |   |   |   |   |
| Total |   |   | 135.5 |   |   |   |   |
| 2 | 1 | 105 | 5.5 | 0.92 | 6.8 | 8.70 | Solid |
|   | 2 | 175-205 | 72.0 | 0.99 | 14.2 | 24.71 |   |
|   | 3 | 210-220 | 23.0 | 0.89 | 20.8 | 29.04 |   |
|   | 4 | 235-310 | 37.0 | 1.09 | 17.5 | 29.19 |   |
|   | Residue | >310 | 11.0 |   |   |   |   |
| Total |   |   | 148.5 |   |   |   |   |
| 3 | 1 | 79-139 | 10.0 | 0.91 | 1.2 |   |   |
|   | 2 | 140 | 44.1 | 0.98 | 1.8 | 28.55 |   |
|   | 3 | 159-215 | 32.5 | 1.25 | 21.2 | 30.33 |   |
|   | 4 | 221-278 | 6.5 | 1.08 | 20.6 | 28.88 |   |
|   | Residue | >278 | 13.0 |   |   |   |   |
| Total |   |   | 106.1 |   |   |   |   |
| 4 | 1 | 155-190 | 25.0 | 0.89 | 5.9 | 23.05 |   |
|   | 2 | 206-237 | 36.5 | 1.12 | 18.4 | 27.96 |   |
|   | 3 | 242-323 | 25.0 | 1.19 | 20.4 | 31.02 |   |
|   | Residue | >323 | 18.0 |   |   |   |   |
| Total |   |   | 104.5 |   |   |   |   |
| 5 | Residue |   |   |   | 2.6 | 1.9 |   |
| 6 | Residue |   |   |   | 4.75 | 13.5 |   |
| 7 | 1 | 193-239 | 78.5 | 0.79 |   | 6.9 |   |
|   | 2 | 244-270 | 74 | 0.88 |   | 18.2 |   |
|   | 3 | 289-336 | 72.0 | 0.98 |   | 21.3 |   |
|   | 4 | 336-305 | 10 | 1.00 |   | [1] 30.5 |   |
|   | Residue | >336 | 60 | 0.88 |   | 10.0 |   |
| Total |   |   | 394.5 |   |   |   |   |
| 8 | 1 | 194-243 | 15 | 0.88 |   | 19.3 |   |
|   | 2 | 260-300 | 39 | 0.98 |   | 26.3 |   |
|   | 3 | 300-287 | 19 | 1.08 |   | 41.5 |   |
|   | Residue | >300 |   | 1.05 |   | 35.5 |   |
| Total |   |   | 73 |   |   |   |   |
| 9 | 1 | 170-190 | 145 | 0.75 |   | [2] |   |
|   | Residue | >190 | 8 | 0.89 |   | 10.86 |   |
| Total |   |   | 153 |   |   |   |   |

[1] $C_{10}H_{12}CCl_3$ has 29.6% chlorine.
[2] Chiefly recovered decene-1.

The terms "Freon 12" and "Freon 113" are trade names of $CF_2Cl_2$ and $CF_2ClCFCl_2$.

The characteristics of the reaction products indicate that they are mixtures of a number of different chemical compounds. It is within the scope of this invention to use any such mixtures, as produced, or to separate from any such mixture either by fractional distillation, solvent extraction, or otherwise, any fraction thereof, which is found suitable for any particular purpose. The higher boiling fractions will be more suited for use as synthetic lubricants, or addition agents for mineral oil, or as carriers for insecticides, whereas the lower boiling fractions will be more suitable for use as refrigerants, selective solvents, and the like.

We claim:

1. A method for effecting the condensation of a mono-olefin, selected from the group consisting of aliphatic mono-olefins and alicyclic mono-olefins, with a compound of the formula $CF_2ClCFCl_2$, which comprises heating a mixture of said mono-olefin and said $CF_2ClCFCl_2$, in which mixture said $CF_2ClCFCl_2$ is present in molecular excess, in the presence of between 0.3% and 5.0% by weight of oxygen, based on the total weight of the reactants, at a temperature of at least 25° C. and at a pressure of at least 100 pounds per square inch.

2. A method for effecting the condensation of octene-2 with a compound of the formula $CF_2ClCFCl_2$ which comprises heating a mixture of said octene-2 and said $CF_2ClCFCl_2$, in which mixture said $CF_2ClCFCl_2$ is present in molecular excess, in the presence of from 0.3% to 1% of oxygen based on the total weight of the reactants, at a temperature of from about 100° C. to about 250° C. and at a pressure of from about 600 to about 1400 pounds per square inch.

3. A method for effecting the condensation of cyclohexene with a compound of the formula $CF_2ClCFCl_2$ which comprises heating a mixture of said cyclohexene and said $CF_2ClCFCl_2$, in which mixture said $CF_2ClCFCl_2$ is present in molecular excess, in the presence of from 0.3% to 1% of oxygen based on the total weight of the reactants, at a temperature of from about 100° C. to about 250° C. and at a pressure of from about 600 to about 1400 pounds per square inch.

4. A method for effecting the condensation of octene-1 with a compound of the formula $CF_2ClCFCl_2$ which comprises heating a mixture of said octene-1 and said $CF_2ClCFCl_2$, in which mixture said $CF_2ClCFCl_2$ is present in molecular excess, in the presence of from 0.3% to 1% of oxygen based on the total weight of the reactants, at a temperature of from about 100° C. to about 250° C. and at a pressure of from about 600 to about 1400 pounds per square inch.

CHARLES F. FEASLEY.
WILLIAM A. STOVER.

REFERENCES CITED

The following references are of record in the file of this patent:

UNITED STATES PATENTS

| Number | Name | Date |
|---|---|---|
| 2,440,800 | Hanford et al. | May 4, 1948 |
| 2,468,208 | Kharasch | Apr. 26, 1949 |

FOREIGN PATENTS

| Number | Country | Date |
|---|---|---|
| 581,899 | Great Britain | Oct. 29, 1946 |